United States Patent
Vedula et al.

(10) Patent No.: US 12,355,846 B2
(45) Date of Patent: *Jul. 8, 2025

(54) PROVISION OF A LEASE FOR STREAMING CONTENT

(71) Applicant: Apple Inc., Cupertino, CA (US)

(72) Inventors: Srinivas Vedula, Fremont, CA (US); Daniel P. Carter, San Jose, CA (US); Gianpaolo Fasoli, Redwood City, CA (US); Augustin J. Farrugia, Los Altos Hills, CA (US); Eugene Jivotovski, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,154

(22) Filed: Apr. 2, 2024

(65) Prior Publication Data

US 2024/0251019 A1 Jul. 25, 2024

Related U.S. Application Data

(60) Continuation of application No. 17/228,603, filed on Apr. 12, 2021, now Pat. No. 11,956,323, which is a
(Continued)

(51) Int. Cl.
*H04L 9/40* (2022.01)
*H04L 9/32* (2006.01)
(Continued)

(52) U.S. Cl.
CPC .......... *H04L 67/306* (2013.01); *H04L 9/3213* (2013.01); *H04L 63/10* (2013.01);
(Continued)

(58) Field of Classification Search
CPC . H04L 63/0892; H04L 63/108; H04L 9/3213; H04L 65/60; G06F 21/1011; G06F 21/1014; G06F 21/1015
See application file for complete search history.

(56) References Cited

U.S. PATENT DOCUMENTS 6,990,579 B1 1/2006 Herbert et al.
7,210,169 B2 4/2007 Smith et al.
(Continued)

FOREIGN PATENT DOCUMENTS

GB 2500452 A 9/2013

*Primary Examiner* — Eric W Shepperd
(74) *Attorney, Agent, or Firm* — Kubota & Basol LLP

(57) ABSTRACT

This application relates to embodiments for providing a content stream to a device from a content server based on a protocol that is established between the device and an account server. The account server can initiate a session with the device and provide the device with a list of channels available for a user account associated with the device. When a channel is selected at the device, conditional access information can be provided from the account server to the device, which can thereafter relay the conditional access information to the content server. The content server can use the conditional access information to verify that the device has the appropriate permission to receive streaming content. In this way, because the conditional access information originates at the account server, permission to access streaming content can be managed by correspondence between the account server and the device, rather than the content server.

22 Claims, 7 Drawing Sheets

Related U.S. Application Data division of application No. 16/539,512, filed on Aug. 13, 2019, now Pat. No. 10,979,529, which is a division of application No. 14/871,567, filed on Sep. 30, 2015, now Pat. No. 10,382,578.

(60) Provisional application No. 62/171,884, filed on Jun. 5, 2015.

(51) Int. Cl.
 H04L 65/60 (2022.01)
 H04L 67/306 (2022.01)
 H04L 67/146 (2022.01)

(52) U.S. Cl.
 CPC ............ H04L 65/60 (2013.01); H04L 63/108 (2013.01); H04L 67/146 (2013.01)

(56) References Cited

U.S. PATENT DOCUMENTS

| | | |
|---|---|---|
| 8,819,803 B1 | 8/2014 | Richards et al. |
| 8,918,908 B2 | 12/2014 | Ziskind et al. |
| 8,959,605 B2 | 2/2015 | Henzie et al. |
| 9,397,990 B1* | 7/2016 | Taly .......................... H04L 63/08 |
| 10,044,718 B2 | 8/2018 | Burrows et al. |
| 10,382,578 B2 | 8/2019 | Vedula et al. |
| 2003/0093694 A1 | 5/2003 | Medvinsky et al. |
| 2004/0086127 A1 | 5/2004 | Candelore |
| 2004/0128499 A1 | 7/2004 | Peterka et al. |
| 2004/0161111 A1 | 8/2004 | Sherman |
| 2005/0021469 A1 | 1/2005 | Han |
| 2005/0125358 A1* | 6/2005 | Levin .................... G06Q 10/10 705/59 |
| 2005/0232643 A1 | 10/2005 | Aronson et al. |
| 2005/0240530 A1 | 10/2005 | Watanabe et al. |
| 2006/0101524 A1 | 5/2006 | Weber |
| 2006/0112336 A1 | 5/2006 | Gewickey et al. |
| 2006/0167982 A1* | 7/2006 | Jawa ........................ H04L 12/66 709/203 |
| 2006/0229992 A1 | 10/2006 | Morten et al. |
| 2007/0016923 A1 | 1/2007 | Kwon |
| 2007/0027971 A1 | 2/2007 | Marolia et al. |
| 2007/0094408 A1 | 4/2007 | Gundla et al. |
| 2007/0100757 A1 | 5/2007 | Rhoads |
| 2007/0199076 A1 | 8/2007 | Rensin et al. |
| 2007/0220163 A1 | 9/2007 | Khouderchah et al. |
| 2008/0015927 A1 | 1/2008 | Ramirez |
| 2008/0133715 A1 | 6/2008 | Yoneda et al. |
| 2008/0222694 A1 | 9/2008 | Nakae |
| 2008/0233918 A1 | 9/2008 | Pousti |
| 2008/0307223 A1 | 12/2008 | Brickell et al. |
| 2009/0046838 A1 | 2/2009 | Andreasson |
| 2009/0240947 A1 | 9/2009 | Goyal et al. |
| 2010/0021132 A1 | 1/2010 | Shiragaki et al. |
| 2010/0095110 A1 | 4/2010 | Noble et al. |
| 2010/0180029 A1 | 7/2010 | Fourman |
| 2010/0268840 A1 | 10/2010 | Hiie |
| 2010/0325441 A1 | 12/2010 | Laurie et al. |
| 2011/0047566 A1 | 2/2011 | Matuchniak et al. |
| 2011/0093883 A1 | 4/2011 | Sun |
| 2012/0079577 A1 | 3/2012 | Hao et al. |
| 2012/0110338 A1 | 5/2012 | Druschel et al. |
| 2012/0117586 A1 | 5/2012 | McCoy et al. |
| 2012/0246743 A1 | 9/2012 | Bosch et al. |
| 2012/0311069 A1 | 12/2012 | Robbin et al. |
| 2013/0054958 A1* | 2/2013 | Braness ............ H04N 21/6581 709/219 |
| 2013/0080579 A1 | 3/2013 | Gordon et al. |
| 2013/0094522 A1 | 4/2013 | Moshfeghi |
| 2013/0156187 A1 | 6/2013 | Huh et al. |
| 2013/0160145 A1* | 6/2013 | Henzie ............... H04N 21/6334 726/29 |
| 2013/0191926 A1 | 7/2013 | Chow et al. |
| 2013/0219468 A1 | 8/2013 | Bell |
| 2013/0239189 A1 | 9/2013 | Ionescu et al. |
| 2013/0326041 A1* | 12/2013 | Bellet ................ G06Q 30/0256 709/223 |
| 2013/0332576 A1 | 12/2013 | Lu |
| 2014/0041054 A1 | 2/2014 | Yalcinalp et al. |
| 2014/0090075 A1 | 3/2014 | Verma et al. |
| 2014/0281489 A1 | 9/2014 | Peterka et al. |
| 2014/0330885 A1 | 11/2014 | Schulert |
| 2014/0337957 A1 | 11/2014 | Feekes |
| 2015/0149785 A1 | 5/2015 | Pickering et al. |
| 2015/0256514 A1 | 9/2015 | Laivand et al. |
| 2015/0379243 A1 | 12/2015 | Drake et al. |
| 2016/0072774 A1 | 3/2016 | McRae |
| 2016/0119150 A1 | 4/2016 | Robison et al. |
| 2016/0253907 A1 | 9/2016 | Taveira |
| 2016/0343071 A1 | 11/2016 | Schnidman et al. |
| 2016/0359816 A1 | 12/2016 | Vedula et al. |
| 2019/0244254 A1* | 8/2019 | Lewis ................ G06Q 30/0272 |
| 2021/0234939 A1 | 7/2021 | Vedula |

\* cited by examiner

PROVISION OF A LEASE FOR STREAMING CONTENT

CROSS-REFERENCE TO RELATED APPLICATIONS

The present application is a continuation of U.S. patent application Ser. No. 17/228,603, entitled "PROVISION OF A LEASE FOR STREAMING CONTENT," filed Apr. 12, 2021, set to issue Apr. 2, 2024 as U.S. Pat. No. 11,956,323, which is a divisional of U.S. application Ser. No. 16/539,512, entitled "PROVISION OF A LEASE FOR STREAMING CONTENT," filed Aug. 13, 2019, issued Apr. 13, 2021 as U.S. Pat. No. 10,979,529, which is a divisional of U.S. application Ser. No. 14/871,567, entitled "PROVISION OF A LEASE FOR STREAMING CONTENT," filed Sep. 30, 2015, issued Aug. 13, 2019 as U.S. Pat. No. 10,382,578, which claims the benefit of U.S. Provisional Application No. 62/171,884, entitled "PROVISION OF A LEASE FOR STREAMING CONTENT," filed Jun. 5, 2015, the contents of all of which are incorporated by reference herein in their entirety for all purposes.

FIELD

The described embodiments relate generally to providing content to a device. More particularly, the described embodiments relate to a content management system that allows a device to stream content from a third party provider without requiring direct transactions between an account server, associated with the device, and a third party server.

BACKGROUND

Content management has been a difficult task for companies that provide streaming content to users. Often times, content providers are unable to secure channels between a user and the content provider because of malicious attacks that cause some content to be compromised. As a result, content streams that are delivered on a per user basis can be made available to persons not having any account or subscription associated with the content provider. Although recent advances in encryption and networking have improved content management issues to some extent, the growing number of content providers and user devices has exacerbated issues related to content delivery leaving no streamlined protocol for secure content delivery.

SUMMARY

This paper describes various embodiments that relate to systems, methods, and apparatus for streaming content from a content server based on conditions provided by an account server. In some embodiments, a computing device associated with a user account is set forth for accessing content provided by a content server. The computing device can include a transmitter configured to send a request to an account server associated with the user account and receive, from the account server, conditional access information (CAI) for streaming the content from the content server. The computing device can also include a processor configured to receive a selection of content and, in response to the selection of content, provide the CAI to the content server via the transmitter. The computing device can further include a user interface configured to output content provided by the content server. The content can be provided from the content server as encrypted content. The computing device can decrypt the content using a key provided by the content server in response to the content server verifying the CAI. The CAI can include a session identifier that is provided to the computing device from the account server. The transmitter can be configured to send the session identifier to the content server with the CAI.

In other embodiments, a method is set forth for permitting a device to authenticate with a content server based on information provided to the device from an account server. The method can include a step of providing conditional access information (CAI) to the device in response to a lease request from the device. The CAI can include a list of content available to a user account associated with the device. The method can further include a step of reducing an number of available device slots associated with the user account in response to the device actively streaming a channel provided to the device by the content server. The device can authenticate with the content server using at least a portion of the CAI. The CAI can include an owner identifier that corresponds the owner of the account server. The device can authenticate with the content server using at least the owner identifier, thereby allowing the content server to verify the originator of the CAI.

In yet other embodiments, a non-transitory machine-readable storage medium is set forth. The storage medium can store instructions that when executed by a processor of a computing device, cause the computing device to perform steps that include receiving a selection of a channel associated with a content stream provided by a content server. The steps can further include sending a key request and conditional access information (CAI) to the content server. The CAI can include a session identifier generated by an account server in response to the device authenticating with an account server. The steps can also include receiving, from the content server, a content stream and a key for decrypting the content stream in response to the content server authenticating the CAI.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
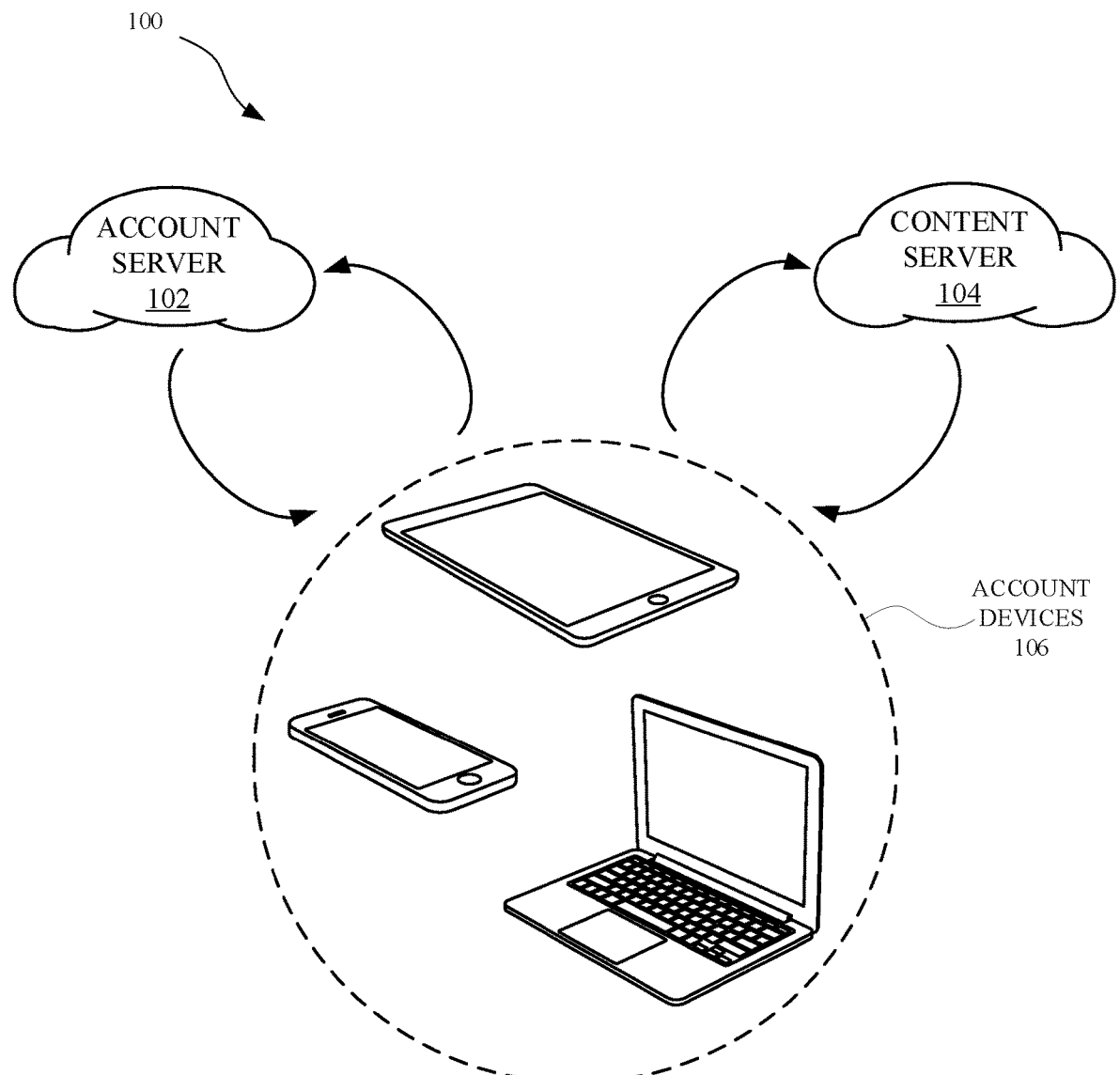
FIG. 1 illustrates a diagram of a system of servers and devices for securing a stream of content from a content server to an account device based on the account device authenticating with an account server.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Many content streaming services have been met with the difficult task of preventing malicious attackers from compromising content purchased by a user. For example, considering the volume of transactions that occur between servers to enable a user to receive content, there are more than enough opportunities for hackers to compromise the content streaming process. Some content providers depend on transactions between a server of the content provider and a server hosting a user account to secure a content stream between the server of the content provider and a client device. However, this approach to content streaming can be volatile when multiple streams are approved for a single user account. Therefore, consolidating the number of transactions between the various devices and servers while enforcing certain restrictions on content streams can yield more secure and manageable content streams.

The embodiments discussed herein relate to systems, methods, and apparatus for receiving or providing streaming content associated with a content provider based on various transactions. The transactions can occur between a device associated with a user account, an account server that manages the user account, and a content server associated with a provider of streaming content. A content manager on the device can act as a mediary between the account server and the content server. The content manager can provide conditional access to content from the content server based on data received from the account server, which can specify the conditions of access to the content. Conditional access can be granted through the content manager or a third party application associated with the device. The conditions of access to content can include limits on a maximum number of streams that can be simultaneously provided to devices associated with a user account, and entitlements to channels for which the user has paid or otherwise received permission to view.

Access to content can be provided to a device according to leases that are generated by an account server that manages an account associated with the device. The leases can provide permission to view one or more channels or other streams of content from a content provider. For example, when a user of the device accesses the content manager on the device, the user can be presented with a number of options of content to view. In order to filter the channels available to a user or device, the user or device can authenticate with the account server to determine the channels that are accessible to the user account. Once the channels have been filtered and presented to a user, the user can select a channel to view. In response, the device can send a request to the account server for a lease to stream content corresponding to the selected channel. A lease manager on the account server can thereafter receive the request. The lease manager can be tasked with tracking the number of devices associated with the user account that are currently streaming content or otherwise using active leases for streaming content. If a maximum number of active leases or devices streaming content (i.e., device slots) has been reached then a lease will not be provided to the device requesting the lease until a stream is paused, stopped, or otherwise ended. In other words, the device will not receive a lease until a device slot has opened up. A device slot opens up when the number of active leases or devices streaming content becomes less than the maximum number of device slots. Thereafter, a lease can be provided from the account server to the device requesting the lease.

In some embodiments, a lease can have an expiration that causes the lease to expire after a predetermined amount of time. The amount of time before expiration can be set by the account server or the device requesting the lease. When streaming content associated with a lease that has an expiration, the streaming content can be played by a device that received the lease until the lease expires. When the lease expires, the content manager on the device can stop or pause playback of the streaming content until the lease is renewed or a new lease is otherwise granted by the account server. In response to a lease expiring, the lease management module can make available another device slot or lease for a device to stream content. In this way, if a maximum number of device slots is reached and a lease of one device thereafter expires, another device may request and receive a lease without exceeding the maximum number of device slots.

Each user account managed by the account server can be associated with a fixed number of device slots. A device slot can correspond to a single device rather than a stream. Therefore, a device that occupies a single device slot can be receiving multiple streams of content without necessitating more than one device slot. Furthermore, the device slot will remain occupied by the device as long as at least one content stream is playing at the device. However, when the content stream is no longer playing, the device slot will no longer be occupied by the device and a new lease must be requested by the device in order to continue playing the content stream. In some embodiments, during playback at a device, a lease is continually being renewed based on a predetermined renewal period. For example, a time period (e.g., 10 minutes) can be set by the account server and the lease can be renewed each time the time period lapses. The lease can be renewed in response to requests that are sent from the device to the account server in order to renew the lease before the time period for renewing the lease ends. The content manager that requests the leases for the device can be programmed to perform renewals one or more times within each time period.

In addition to providing leases to devices, the account server can provide conditional access information (CAI) to devices associated with a user account in order to allow the devices to request content from a content server associated with a content provider. The CAI can include channel entitlements that correspond to one or more channels that the user account is authorized to stream from the content server. Additionally, the CAI can relay to a content provider that the user sending the channel entitlements is signed into their respective user account, has subscribed to certain content hosted by the content server, and has a lease from the account server. The content manager of the device can receive the CAI from the account server and thereafter send the CAI, or an encrypted version of the CAI, to a content server associated with a content provider. By encrypting the CAI, an attacker can be prevented from counterfeiting a lease in order to redirect a content stream from an intended recipient. Each channel entitlement in the CAI sent can be compared to a list of channels offered by a content provider. For example, if a channel entitlement corresponds to all channels that are offered by a content provider, the content provider can grant the device access to all the channels. If the channel entitlement corresponds to less than all channels offered by the content provider, the content provider can grant the device access to only certain channels as defined by the channel entitlement. So long as the device has a lease, a user can use the device to switch between different channels to which the device is entitled to view. The CAI sent to the content server can be accompanied by a key request from the content manager of the device. In response to a key request, the content server can send a key that can enable the device to decrypt content from the content server or other source (e.g., a web server). The key can be provided to the device out of band with respect to the content stream provided by the content server.

The CAI can also be associated with a session identifier that is created at the account server in response to the user authenticating with the account server through the device. Additionally, the session identifier can correspond to an active lease being used by the device requesting the content from the content server. In this way, a new session identifier can be sent to the content server each time a lease is renewed. This allows the content provider to verify that the device is not requesting content after a lease has expired. For example, if the session identifier corresponds to a session that does not exist or a lease that previously expired, content will be denied to the requesting device. As a result, the content server will not provide a key to the device and the device will not be able to decrypt the content being requested by the device.

Although the content manager operates on the device requesting streaming content from the content provider, the content manager can enable other applications on the device to access streaming content from the content provider. For example, third party applications associated with the content provider can be provided access to the streaming content via the content manager of the device.

An example of a device accessing streaming content based on correspondence between an account server and a content server can be performed according to the following transactions. Initially, a device associated with a user account can authenticate with an account server that manages user account information. A lease manager of the account server can generate a session identifier, which can be used to identify a device slot for the device and a lease for playing from the content server. If a device slot is available, a lease can be granted to the device. The lease allows the device to receive, from the account server, conditional access information which can include one or more of: the session identifier, an identifier corresponding to the originator of the session identifier, a list of channel entitlements that the user has access to, a time of origination for the conditional access information, and an amount of time that the conditional access information is valid. In this way, the conditional access information will not explicitly identify a user, allowing the user to remain anonymous to the content manager or content provider. Upon receipt of the conditional access information by the device, the device can encrypt at least a portion of the conditional access information and provide the encrypted conditional access information to the content server. In response, the content server can verify that: the conditional access information was created or originated by the account server, the channel entitlements and the originator are associated with the content provider, and the lease has not expired. Once one or more of these conditions have been verified, the content server can provide the content to the device along with a key for decrypting the content. The device can thereafter play the decrypted content for a user.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a diagram 100 of a system of servers and devices for securing a stream of content from a content server 104 to an account device 106 based on an account device 106 authenticating with an account server 102. Each of the account devices 106 can be associated with an account for streaming content from a content server 104. The account devices 106 can include one or more of a laptop, cell phone, media player, wearable computing device, display panel, tablet computing, desktop computer, and/or any other computing device capable of receiving streaming content. The account can be managed by the account server 102. For example, a user of one of the account devices can obtain permission to stream content from the content server 104 based on one or more transactions with the account server 102. The account server 102 can manage conditions for streaming content and provide conditional access information to the account devices 106 when the conditions for streaming content are met. For example, the account server 102 can store a maximum number of device slots, which corresponds to a number of account devices 106 that can simultaneously stream content from the content server 104. If the maximum number of device slots is equal to the number of account devices 106 simultaneously streaming content, conditions will not be met for other devices associated with the account to stream content from the content server 104.

The account server 102 can be owned or managed by a different entity than the content server 104. For example, the account server 102 can be associated with a manufacturer of the account devices 106, and the content server 104 can be associated with a media company. A user associated with an account managed by the account server 102 can pay for content by using an account device 106 to conduct a transaction with the account server 102. In response, the account device 106 can receive conditional access information, which can be provided to the content server 104 for initiating a stream of content from the content server 104.

The conditional access information can be provided from the account device 106 to the content server 104 with a key request. If the content server 104 successfully verifies the authenticity of the conditional access information, the content server 104 will provide the content stream to the account device 106 along with a key for decrypting the content stream. The key can be provided in a frequency band that is different than a frequency band of the content stream in order to provide an additional layer of protection against attackers attempting to comprise the content stream. Additionally, in some embodiments, the conditional access information provided to the content server 104 can identify an account device 106 but not a user of an account device 106. Therefore, the user can remain anonymous when conducting transactions with the content server 104. Instead, the conditional access information can include data that identifies an owner of the account server 102 and/or a signature of the owner, which in part allows the content server 104 to determine that the content stream was purchased through a partner of the content provider. The conditional access information can further include data that allows the content server 104 to confirm that the user is authenticated with the partner of the content server, the user has paid for or otherwise been granted permission to access content from the content server, and the maximum device slot limit has not been exceeded by the device.

The content stream can be provided from the content server 104 until the content stream expires. The content stream can expire when a session identifier provided with the conditional access information indicates that the playback of the content stream has exceeded an expiration time without a lease being renewed with the account server 102. For example, the account server 102 can generate a session start time and a session identifier, and provide each of the session start time and the session identifier to the account device 106 with the conditional access information. The account device 106 can thereafter provide the session start time and the session identifier to the content server 104 with the conditional access information. If the account device 106 does not provide updated conditional access information to the content server 104 before a predetermined amount of time has elapsed since the session start time, the content server 104 can stop the content stream to the account device 106. In some embodiments, the account device 106 can stop playback of the content stream if the account device 106 does not receive updated conditional access information before a predetermined amount of time has elapsed since the session start time. The predetermined amount of time can be set by the account server 102, the account device 106, the content server 104, or any other device or entity that can assist in managing a content stream. The content stream can refer to any type of data that can be transmitted between devices. For example, the content stream can include media data, device data, device instructions, and/or any other data that can be stored or read by a device.

When the content stream stops playing at an account device 106, a device slot can be opened up by the account server 102 based on a notification from the account device 106 to the account server 102. Although the account device 106 can request renewal of the lease in order to continue streaming, a different account device 106 can also request a lease at this time in order to receive a content stream from the content server. If only one device slot is available, then the first device to successfully receive a lease will be able to stream content from the content server 104.

Figure 2:
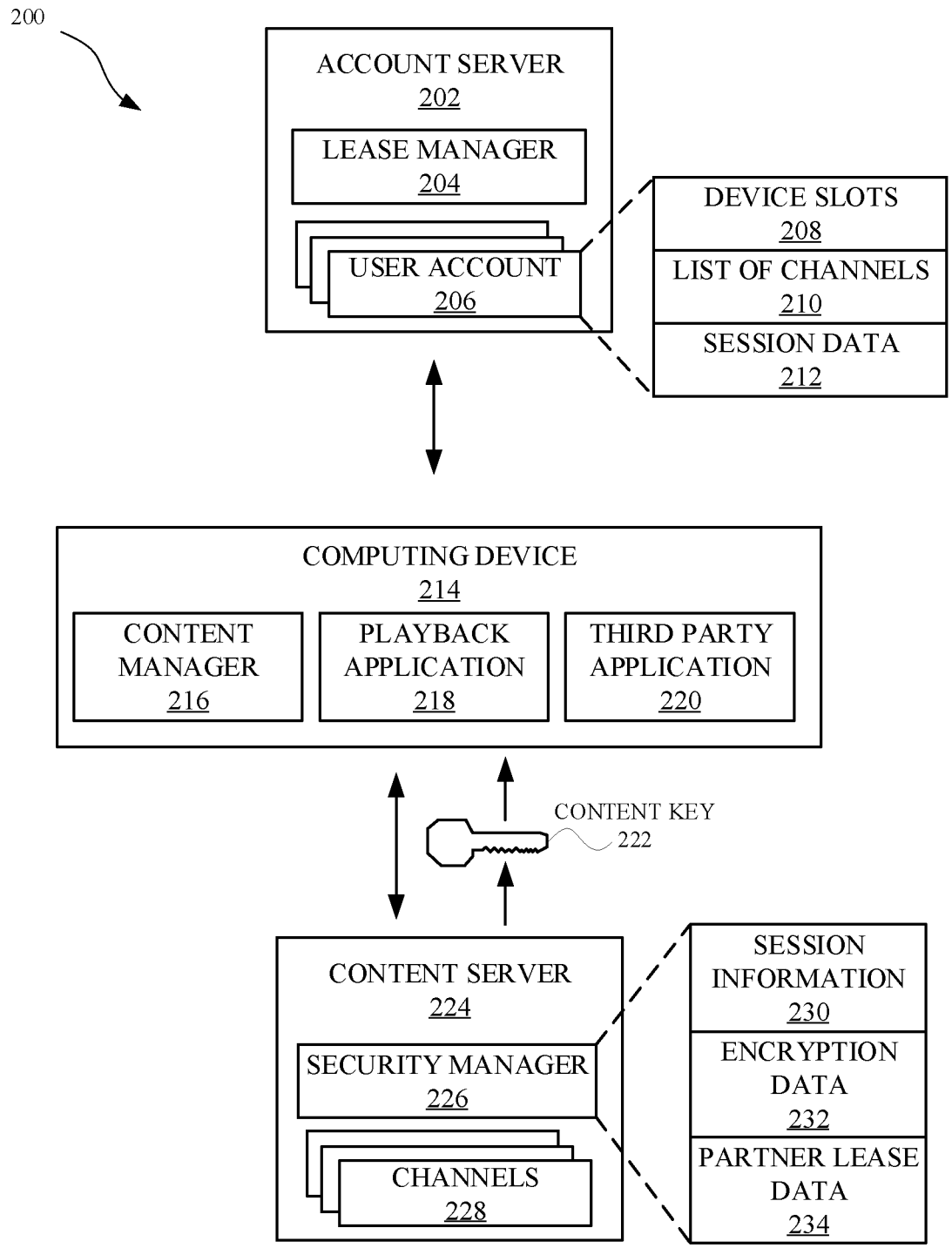
FIG. 2 illustrates a system diagram for illustrating a computing device receiving streaming content from a content server based on one or more transactions with an account server.

FIG. 2 illustrates a system diagram 200 for illustrating a computing device 214 receiving streaming content from a content server 224 based on one or more transactions with an account server 202. The account server 202 can include a lease manager 204 that can be responsible for managing leases that are generated for different account devices such as computing device 214. Initially, the computing device 214 can authenticate with the account server 202 so that the account server 202 can verify that the computing device 214 is associated with a user account 206 managed by the account server 202. In response to successfully authenticating with the computing device 214, the account server 202 can create session data 212 for the user account 206 and send the computing device a list of channels 210. The session data 212 can thereafter be used when the computing device 214 requests a device slot 208 for streaming content from the content server 224. The list of channels 210 represents channels 228 of the content server 224 that devices associated with the user account 206 can access. A content manager 216 of the computing device 214 can receive the list of channels 210 and present the list of channels 210 to a user of the computing device 214. The user can select a channel 228 to stream via the content manager 216 or a third party application 220 associated with the content server 224. In response to the selection of the channel 228 in the list of channels 210, the computing device 214 can send a lease request to the account server 202. If a device slot 208 is available for the computing device 214 to stream content, the account server 202 can provide conditional access information to the computing device 214.

The conditional access information can include at least a portion of the session data 212, a provider identifier corresponding to an owner of the account server 202, the list of channels 210, a time of origination associated with the conditional access information, and/or a validity duration corresponding to a predetermined time that the conditional access information is valid. The conditional access information can be provided, by the computing device 214, to the content server 224. A security manager 226 of the content server 224 can receive the conditional access information and parse the conditional access information for data to verify that the computing device 214 is authorized to receive a content stream from the content server 224. In some embodiments, the conditional access information is encrypted by the computing device 214 before the conditional access information is provided to the content server 224.

The content server 224 can parse and/or store session information 230 and partner lease data 234 from the conditional access information. The partner lease data 234 can be used by the security manager 226 to verify that the conditional access information was originated by a partner associated with the account server 202. The session information 230 can correspond to the list of channels available to the computing device 214, a channel 228 being requested by the computing device 214, and the expiration of the session created with the account server 202. Using the session information 230, the security manager 226 can verify that the conditional access information has not expired and determine the channel 228 corresponding to the streaming content requested by the computing device 214. Thereafter, the streaming content corresponding to the requested channel 228 can be encrypted and provided to the computing device 214. Encryption data 232 managed by the security manager 226 can be used to generate a content key 222 for decrypting the encrypted streaming content. The content key 222 can be provided to the computing device 214 in the same or a different frequency band than the streaming content.

The content manager 216 or a playback application 218 of the computing device 214 can receive the key and the encrypted content, and thereafter decrypt the encrypted content for the playback application 218 or a third party application 220 to output. The decrypted content can be video data, audio data, media data, instructional data, and/or any other type of data that is readable by a computer. Additionally, the decrypted content can be associated with an address such as a uniform resource locator (URL) or other suitable value for identifying content at a server. If playback of the decrypted content is stopped by a user playing the decrypted content or by expiration of the lease, the computing device 214 can request a new lease for streaming content. A request for a new lease can be provided to the account server 202, causing the account server 202 to generate updated session data 212 that can extend the expiration time of a stream of content from the content server 224. The updated session data 212 can be provided back to the computing device 214 in updated conditional access information. The content manager 216 can receive the updated conditional access information and allow the playback application 218 and/or third party application 220 to continue outputting the streaming content based on the updated conditional access information. Lease renewals can occur periodically depending on the type of content stream provided from the content server 224. For example, some content streams, such as live video, can be provided without expiration because the content stream may expire before an expiration time (e.g., an hour). Other content streams such as movies can require multiple lease updates because the length of the movie can be longer than an expiration time.

Figure 3:
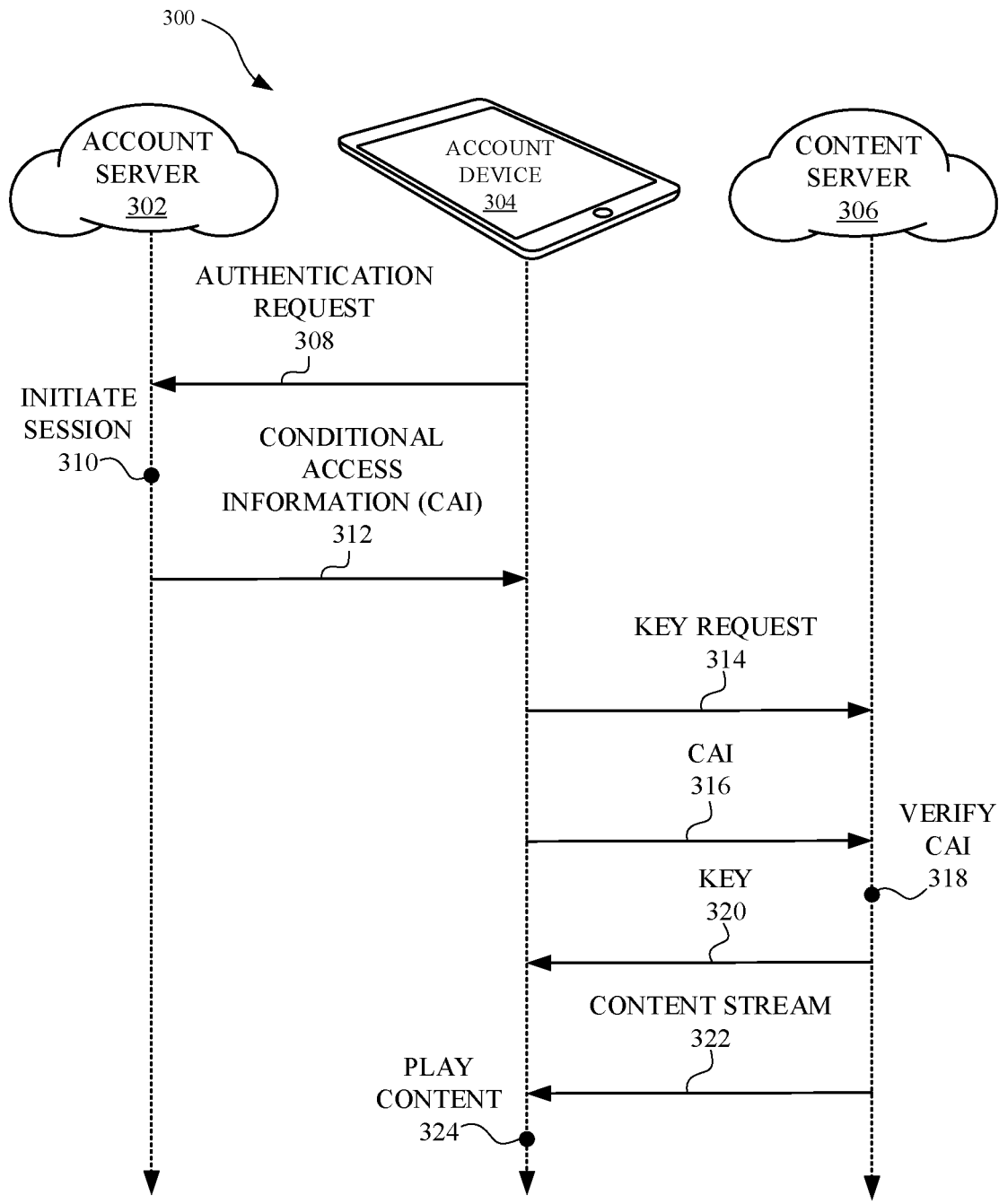
FIG. 3 illustrates a sequence diagram for receiving a content stream from a content server according to some embodiments discussed herein.

FIG. 3 illustrates a sequence diagram 300 for receiving a content stream 322 from a content server 306 according to some embodiments discussed herein. The sequence diagram 300 can provide a relationship between the transactions that take place between an account server 302, an account device 304, and content server 306 in order for the account device 304 to receive the content stream. Initially, an authentication request 308 can be sent to the account server 302. In response, the account server 302 can initiate a session 310 to allow the account device 304 to request content from the content server 306. Once a session has been initiated, conditional access information (CAI) 312 can be provided from the account server 302 to the account device 304. In response, the account device 304 can send a key request 314 and the CAI 316 to the content server 306. The content server 306 can verify the CAI 318, and, in response, send a key 320 and content stream 322 to the account device 304. The account device 304 can thereafter play the content 324 corresponding to the content stream 322. It should be noted that the sequence diagram 300 can be modified according to any of the systems, methods, and apparatus discussed herein.

Figure 4:
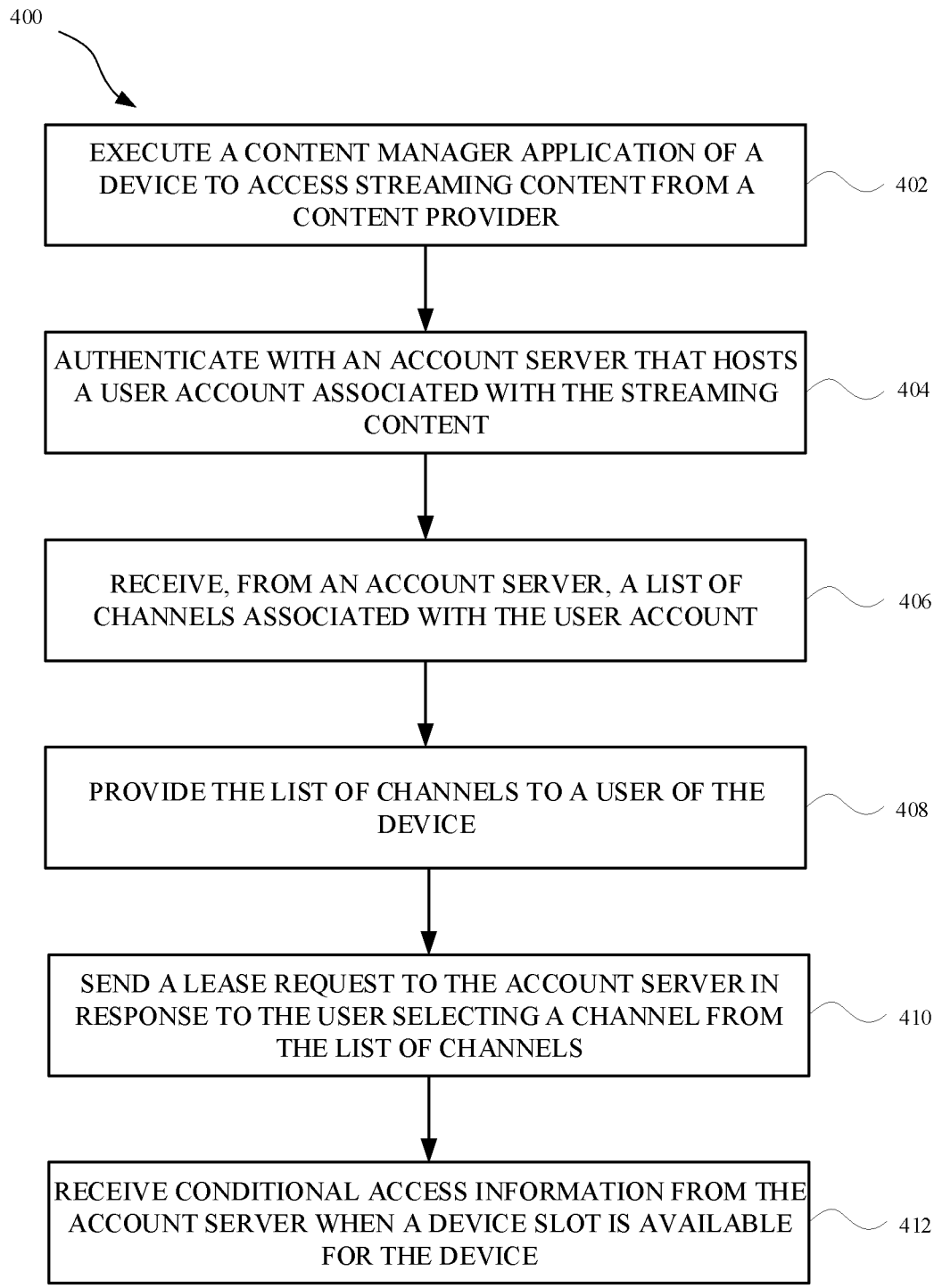
FIG. 4 illustrates a method for receiving conditional access information from an account server based on a number of device slots available for streaming content.

FIG. 4 illustrates a method 400 for receiving conditional access information from an account server based on a number of device slots available for streaming content. The method 400 can be performed by an account device, computing device, or any other device suitable for assisting in receiving content from a content provider. The method 400 can include a step 402 of executing a content manager application of a device to access streaming content from a content provider. At step 404, the device can authenticate with an account server that hosts a user account associated with the streaming content. At step 406, a list of channels associated with the user account can be received from the account server. At step 408, the device can provide the list of channels to a user of the device. At step 410, the device can send a lease request to the account server in response to the user selecting a channel from the list of channels. At step 412, the device can receive conditional access information from the account server when a device slot is available for the device. It should be noted that the method 400 can be modified according to any of the systems, methods, and apparatus discussed herein.

Figure 5:
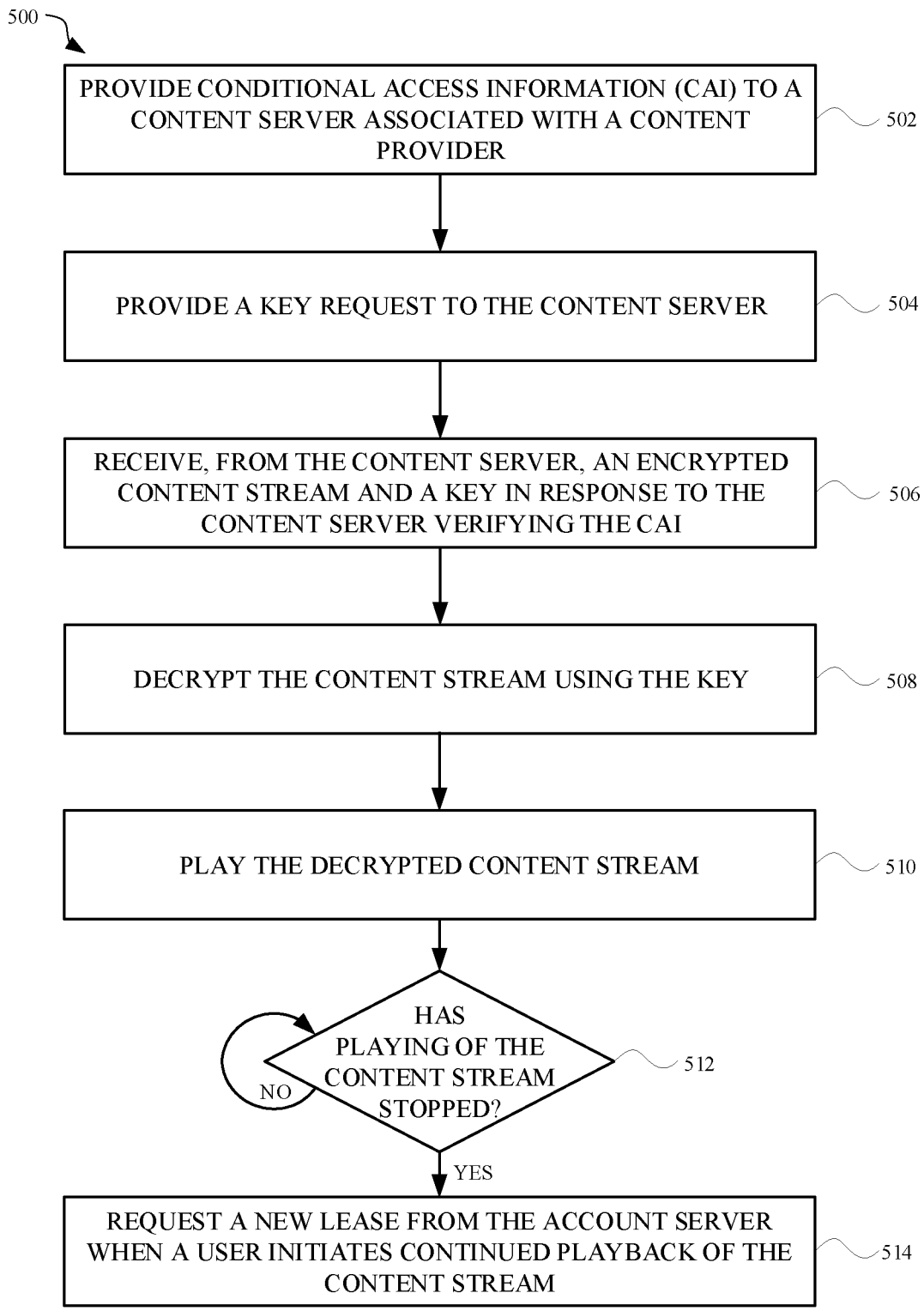
FIG. 5 illustrates a method for streaming content from a content server based on a lease created at an account server.

FIG. 5 illustrates a method 500 for streaming content from a content server based on a lease created at an account server. The method 500 can be performed by an account device, computing device, or any other device suitable for assisting in receiving content from a content provider. The method 500 can include a step 502 of providing conditional access information (CAI) to a content server associated with a content provider. At step 504, a key request is provided to the content server. At step 506, an encrypted content stream and a key are provided from the content server in response to the content server verifying the CAI. At step 508, the content stream is decrypted using the key. At step 510, the device can play the decrypted content stream. At step 512, a determination is made whether the playing of the content stream has stopped. If the playing of the content stream has not stopped then no action may be taken. However, if the content stream has stopped, then, at step 514, the device can request a new lease from the account server when a user initiates continued playback of the content stream. It should be noted that the method 500 can be modified according to any of the systems, methods, and apparatus discussed herein. For example, method 500 can be a continuation of method 400 according to some embodiments.

Figure 6:
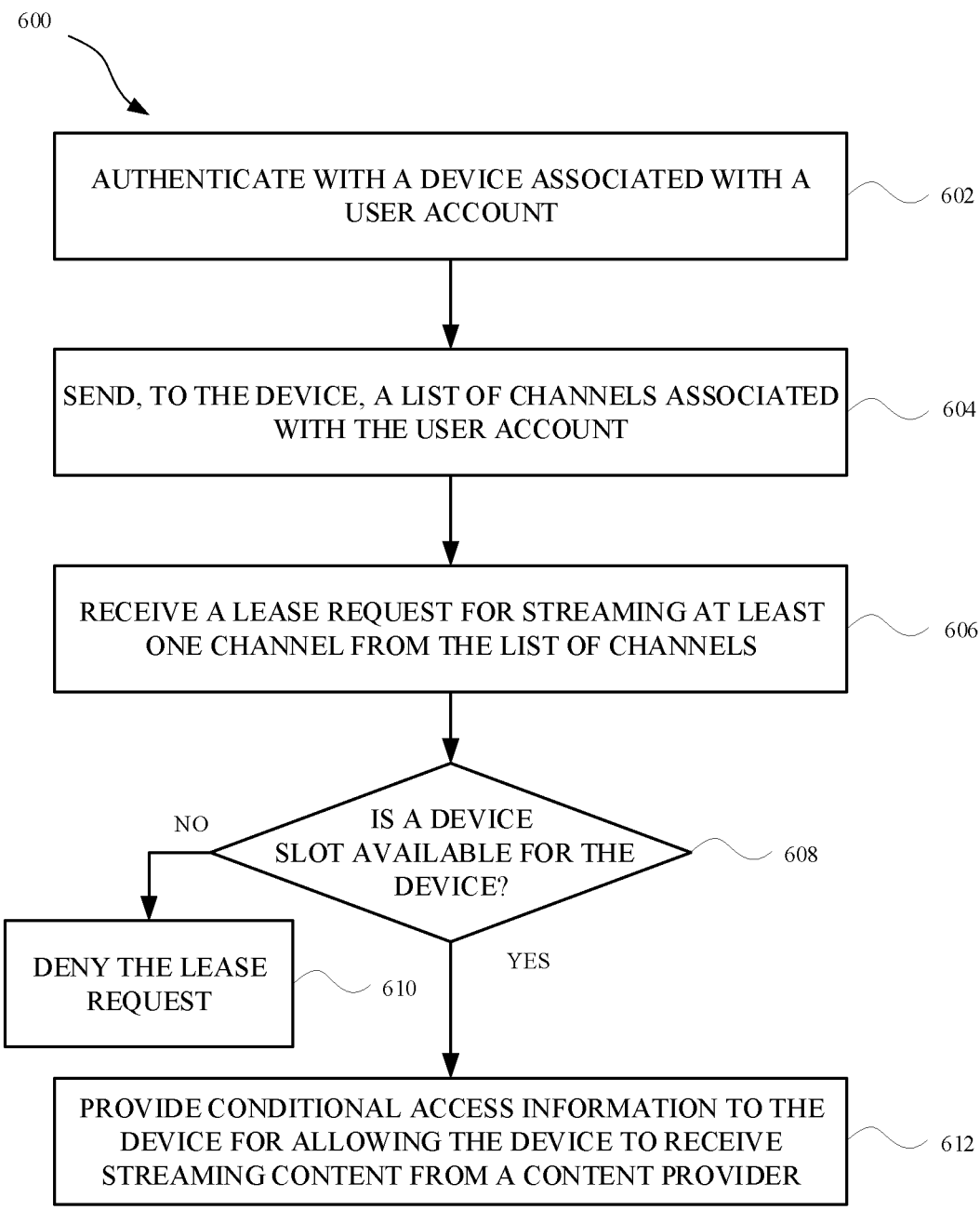
FIG. 6 illustrates a method for using an account server to provide information to an account device to allow the account device to stream content from a content server using the information.

FIG. 6 illustrates a method 600 for using an account server to provide information to an account device thereby allowing the account device to stream content from a content server using the information. The method 600 can be performed by an account server or any other device suitable for assisting a device with streaming content from a content provider. The method 600 can include a step 602 of authenticating with a device associated with a user account managed by the account server. At step 604, a list of channels associated with the user account is sent to the device. At step 606, the account server can receive a lease request from the device for streaming at least one channel from the list of channels. At step 608, a determination is made whether a device slot is available for the device. If a device slot is not available for the device, then, at step 610, the lease request is denied by the account server. However, if a device slot is available for the device, then, at step 612, conditional access information is provided to the device for allowing the device to receive streaming content from a content provider. It should be noted that the method 600 can be modified according to any of the systems, methods, and apparatus discussed herein.

Figure 7:
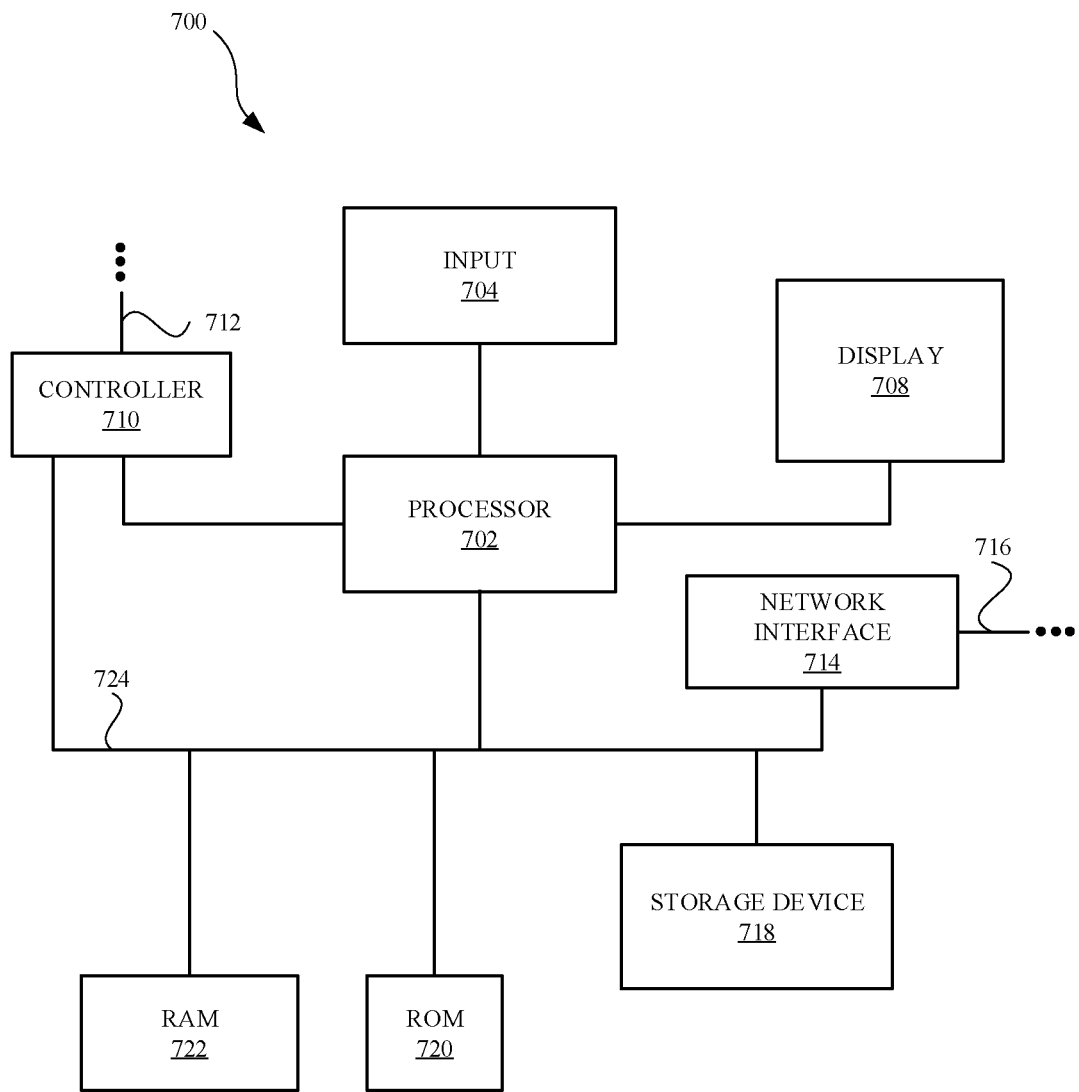
FIG. 7 is a block diagram of a computing device that can represent the components of the account device, content server, account server, computing device and/or any apparatus capable of providing the embodiments discussed herein.

FIG. 7 is a block diagram of a computing device 700 that can represent the components of the account device, content server, account server, computing device and/or any apparatus capable of providing the embodiments discussed herein. It will be appreciated that the components, devices or elements illustrated in and described with respect to FIG. 7 may not be mandatory and thus some may be omitted in certain embodiments. The computing device 700 can include a processor 702 that represents a microprocessor, a coprocessor, circuitry and/or a controller 710 for controlling the overall operation of computing device 700. Although illustrated as a single processor, it can be appreciated that the processor 702 can include a plurality of processors. The plurality of processors can be in operative communication with each other and can be collectively configured to perform one or more functionalities of the computing device 700 as described herein. In some embodiments, the processor 702 can be configured to execute instructions that can be stored at the computing device 700 and/or can be otherwise accessible to the processor 702. As such, whether configured by hardware or by a combination of hardware and software, the processor 702 can be capable of performing operations and actions in accordance with embodiments described herein.

The computing device 700 can also include user input device 704 that allows a user of the computing device 700 to interact with the computing device 700. For example, user input device 704 can take a variety of forms, such as a button, keypad, dial, touch screen, audio input interface, visual/image capture input interface, input in the form of sensor data, etc. Still further, the computing device 700 can include a display 708 (screen display) that can be controlled by processor 702 to display information to a user. Controller 710 can be used to interface with and control different equipment through equipment control bus 712. The computing device 700 can also include a network/bus interface 714 that couples to data link 716. Data link 716 can allow the computing device 700 to couple to a host computer or to accessory devices. The data link 716 can be provided over a wired connection or a wireless connection. In the case of a wireless connection, network/bus interface 714 can include a wireless transceiver.

The computing device 700 can also include a storage device 718, which can have a single disk or a plurality of disks (e.g., hard drives) and a storage management module that manages one or more partitions (also referred to herein as "logical volumes") within the storage device 718. In some embodiments, the storage device 718 can include flash memory, semiconductor (solid state) memory or the like. Still further, the computing device 700 can include Read-Only Memory (ROM) 720 and Random Access Memory (RAM) 722. The ROM 720 can store programs, code, instructions, utilities or processes to be executed in a non-volatile manner. The RAM 722 can provide volatile data storage, and store instructions related to components of the storage management module that are configured to carry out the various techniques described herein. The computing device 700 can further include data bus 724. Data bus 724 can facilitate data and signal transfer between at least processor 702, controller 710, network/bus interface 714, storage device 718, ROM 720, and RAM 722.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a computing device associated with a user account to access content provided by a content provider, the method comprising, by an account server:
   receiving, from the computing device, a request to access the content;
   in response to receiving the request to access the content:
      determining, based on one or more device slots associated with the user account and the content provider, that at least one device slot is available; and
      in accordance with a determination that at least one device slot is available, providing, to the computing device, conditional access information (CAI) for receiving the content from the content provider, wherein the CAI:
         (i) indicates that the user account is authorized to access the content, and
         (ii) causes the computing device to provide the CAI to the content provider to enable the computing device to play back the content, wherein:
   while a respective device slot of the one or more device slots associated with the user account is occupied by the computing device associated with the user account, the computing device is able to access second content different from the content using the respective device slot.

2. The method of claim 1, further comprising:
   receiving, from the computing device, an indication that the computing device is playing back the content; and
   updating a configuration associated with the one or more device slots to reflect that the computing device is playing back the content.

3. The method of claim 2, wherein a lease associated with the CAI is configured to, after a predetermined time period has lapsed, cause the computing device to, while the computing device is playing back the content:
   generate an additional request for a subsequent lease; and
   send the additional request to the account server.

4. The method of claim 2, further comprising:
   receiving, from the computing device, a second indication that the computing device is no longer playing back the content; and
   updating the configuration to reflect that the computing device is no longer playing back the content.

5. The method of claim 1, further comprising:
   receiving, from a second computing device associated with the user account, a second request to access the content;
   determining, based on the one or more device slots, that no device slots are available; and
   providing, to the second computing device, a denial of the second request.

6. The method of claim 1, further comprising:
   providing, to the content provider, at least a portion of the CAI.

7. The method of claim 1, wherein the CAI includes:
   a session identifier, and
   an owner ID that corresponds to the account server.

8. The method of claim 1, further comprising:
while the respective device slot is occupied by the computing device associated with the user account, providing, to the computing device, conditional access information (CAI) for receiving the second content using the respective device slot.

9. The method of claim 1, wherein accessing the second content using the respective device slot is without requesting another device slot.

10. A non-transitory computer readable storage medium configured to store instructions that, when executed by at least one processor included in an account server, cause the account server to enable a computing device associated with a user account to access content provided by a content provider, by carrying out steps that include:
receiving, from the computing device, a request to access the content;
in response to receiving the request to access the content:
determining, based on one or more device slots associated with the user account and the content provider, that at least one device slot is available; and
in accordance with a determination that at least one device slot is available, providing, to the computing device, conditional access information (CAI) for receiving the content from the content provider, wherein the CAI:
(i) indicates that the user account is authorized to access the content, and
(ii) causes the computing device to provide the CAI to the content provider to enable the computing device to play back the content, wherein:
while a device slot of the one or more device slots associated with the user account is occupied by the computing device associated with the user account, the computing device is able to access second content different from the content using the device slot.

11. The non-transitory computer readable storage medium of claim 10, wherein the steps further include:
receiving, from the computing device, an indication that the computing device is playing back the content; and
updating a configuration associated with the one or more device slots to reflect that the computing device is playing back the content.

12. The non-transitory computer readable storage medium of claim 11, wherein a lease associated with the CAI is configured to, after a predetermined time period has lapsed, cause the computing device to, while the computing device is playing back the content:
generate an additional request for a subsequent lease; and
send the additional request to the account server.

13. The non-transitory computer readable storage medium of claim 11, wherein the steps further include:
receiving, from the computing device, a second indication that the computing device is no longer playing back the content; and
updating the configuration to reflect that the computing device is no longer playing back the content.

14. The non-transitory computer readable storage medium of claim 10, wherein the steps further include:
receiving, from a second computing device associated with the user account, a second request to access the content;
determining, based on the one or more device slots, that no device slots are available; and
providing, to the second computing device, a denial of the second request.

15. The non-transitory computer readable storage medium of claim 10, wherein the steps further include:
providing, to the content provider, at least a portion of the CAI.

16. The non-transitory computer readable storage medium of claim 10, wherein the CAI includes:
a session identifier, and
an owner ID that corresponds to the account server.

17. An account server configured to enable a computing device associated with a user account to access content provided by a content provider, the account server comprising at least one hardware processor configured to cause the account server to carry out steps that include:
receiving, from the computing device, a request to access the content;
in response to receiving the request to access the content:
determining, based on one or more device slots associated with the user account and the content provider, that at least one device slot is available; and
in accordance with a determination that at least one device slot is available, providing, to the computing device, conditional access information (CAI) for receiving the content from the content provider, wherein the CAI:
(i) indicates that the user account is authorized to access the content, and
(ii) causes the computing device to provide the CAI to the content provider to enable the computing device to play back the content, wherein:
while a device slot of the one or more device slots associated with the user account is occupied by the computing device associated with the user account, the computing device is able to access second content different from the content using the device slot.

18. The account server of claim 17, wherein the steps further include:
receiving, from the computing device, an indication that the computing device is playing back the content; and
updating a configuration associated with the one or more device slots to reflect that the computing device is playing back the content.

19. The account server of claim 18, wherein a lease associated with the CAI is configured to, after a predetermined time period has lapsed, cause the computing device to, while the computing device is playing back the content:
generate an additional request for a subsequent lease; and
send the additional request to the account server.

20. The account server of claim 18, wherein the steps further include:
receiving, from the computing device, a second indication that the computing device is no longer playing back the content; and
updating the configuration to reflect that the computing device is no longer playing back the content.

21. The account server of claim 17, wherein the steps further include:
receiving, from a second computing device associated with the user account, a second request to access the content;
determining, based on the one or more device slots, that no device slots are available; and
providing, to the second computing device, a denial of the second request.

22. The account server of claim 17, wherein the steps further include:

providing, to the content provider, at least a portion of the CAI.

\* \* \* \* \*